US012688867B2

(12) United States Patent
Zheng et al.

(10) Patent No.: US 12,688,867 B2
(45) Date of Patent: Jul. 21, 2026

(54) READ SENSOR WITH A LAYER HAVING AN ADJUSTABLE ETCHING RATE

(71) Applicant: Western Digital Technologies, Inc., San Jose, CA (US)

(72) Inventors: Yuankai Zheng, Fremont, CA (US); Chih-Ching Hu, Pleasanton, CA (US); Yung-Hung Wang, San Jose, CA (US); Anup Ghosh Roy, Fremont, CA (US); Guanxiong Li, Fremont, CA (US); James Mac Freitag, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/747,792

(22) Filed: Jun. 19, 2024

(65) Prior Publication Data

US 2025/0391432 A1     Dec. 25, 2025

(51) Int. Cl.
G11B 5/31     (2006.01)

(52) U.S. Cl.
CPC ............ G11B 5/314 (2013.01); G11B 5/3163 (2013.01)

(58) Field of Classification Search
CPC .............................. G11B 5/314; G11B 5/3163
See application file for complete search history.

(56) References Cited

U.S. PATENT DOCUMENTS

| | | |
|---|---|---|
| 6,700,759 B1 | 3/2004 | Knapp et al. |
| 8,611,054 B1 | 12/2013 | Shang et al. |
| 9,064,507 B1 | 6/2015 | Pakala et al. |
| 9,490,054 B2 | 11/2016 | Jan et al. |
| 10,818,837 B1 | 10/2020 | Otani et al. |
| 10,839,833 B1* | 11/2020 | Freitag ................ H01F 10/3286 |
| 11,514,935 B1* | 11/2022 | Liu ........................... G11B 5/11 |
| 11,862,205 B1 | 1/2024 | Freitag et al. |
| 2002/0097540 A1* | 7/2002 | Hayashi .............. G11B 5/3903 |

(Continued)

FOREIGN PATENT DOCUMENTS

| | | |
|---|---|---|
| CN | 111615756 A | 9/2020 |
| JP | 5630963 B2 | 11/2014 |

OTHER PUBLICATIONS

Seed Layer Etching, MEC Company Ltd., https://www.mec-co.com/en/product/electronic-substrate/dou/ (last accessed Jun. 19, 2024).

*Primary Examiner* — Holly Rickman
*Assistant Examiner* — Linda N Chau
(74) *Attorney, Agent, or Firm* — Patterson + Sheridan, LLP

(57)     ABSTRACT

The present disclosure generally relates to magnetic recording heads of magnetic recording devices. To protect and lubricate magnetic elements of the magnetic recording heads (e.g., reader sensors), a coating of carbon is applied to the magnetic element. When there are defects in the carbon coating, the sensor is exposed to air and may corrode causing reader sensor failure. Protrusions and/or recesses may form on the MFS of the sensor when materials that are too hard (e.g., CoHf or Ru) or too soft (e.g., IrMn) are used in the spacer or capping layer of the sensor. By laminating, co-sputtering, or using an alloy with hard materials (e.g., Ta, Ru, and/or Hf) and/or soft materials (e.g., Al, Ti, Cr, and/or Ni) in the spacer and capping layer of the sensor, the formation of protrusion and recesses in the reader sensor may be mitigated.

20 Claims, 9 Drawing Sheets

300

| 308 |
|---|

330
| 332B |
|---|
| 334 |
| 332A |
| 331 |

| 320 |
|---|

310
| 313 |
|---|
| 312B |
| 314 |
| 312A |

| 304 |
|---|

| 302 |
|---|

(56)  References Cited

U.S. PATENT DOCUMENTS

| | | | |
|---|---|---|---|
| 2009/0251829 A1 | 10/2009 | Zhang et al. | |
| 2013/0094108 A1* | 4/2013 | Gao ..................... | G11B 5/3909 |
| | | | 428/812 |
| 2022/0093305 A1* | 3/2022 | Diao .................... | G11B 5/3909 |

* cited by examiner

400

500

Percent of Soft Material vs MR

0%   Soft   Material/
100% Hard Material

100% Soft Material/
0% Hard Material

Various Spacer Layers vs MR

READ SENSOR WITH A LAYER HAVING AN ADJUSTABLE ETCHING RATE

BACKGROUND OF THE DISCLOSURE

Field of the Disclosure

Embodiments of the present disclosure generally relate to magnetic recording heads of magnetic recording devices, such as magnetic read sensors of magnetic read heads of hard disk drives (HDD).

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have been proposed.

However, attempts to narrow reader sensor dimensions, to narrow reader-to-reader spacing, and to increase recording densities can induce instability in magnetic elements (e.g., reader sensors) of the magnetic recording head and can cause sensor failure. For example, two dimensional magnetic recording (TDMR) can be used for increased areal density capability (ADC) and read performance, but can involve instability for sensors. The instability can worsen as when sizes of TDMR devices are narrowed.

In addition, during the backend lapping process, materials that are too hard cause protrusions to form in the reader sensor. These protrusions result in a too thin carbon coating at the media facing surface (MFS) (e.g., an air bearing surface (ABS)). A thin carbon coating exposes the spacer layer and/or capping layer of the reader sensor to air and, in turn, causes the reader sensor to corrode near the layers- resulting in failure of the reader sensor. However, if the spacer layer and/or capping layer of the reader sensor contains materials that are too soft, a recess in the reader sensor forms. These recesses may prevent the MFS from being coated in carbon, which may cause corrosion near the layers and reader sensor failure.

Therefore, there is a need in the art for an improved magnetic read head with an improved spacer and capping layer and method of manufacture.

SUMMARY OF THE DISCLOSURE

The present disclosure generally relates to magnetic recording heads of magnetic recording devices. To protect and lubricate magnetic elements of the magnetic recording heads (e.g., reader sensors), a coating of carbon is applied to the magnetic element. When there are defects in the carbon coating, the sensor is exposed to air and may corrode causing reader sensor failure. Protrusions and/or recesses may form on the MFS of the sensor when materials that are too hard (e.g., CoHf or Ru) or too soft (e.g., IrMn) are used in the spacer or capping layer of the sensor. By laminating, co-sputtering, or using an alloy with hard materials (e.g., Ta, Ru, and/or Hf) and/or soft materials (e.g., Al, Ti, Cr, and/or Ni) in the spacer and capping layer of the sensor, the formation of protrusions and recesses in the reader sensor may be mitigated.

In one embodiment, a read head sensor includes a seed layer; a spacer layer disposed over the seed layer, the spacer layer comprising at least one material selected from a first group consisting of Ta, Ru, Hf, W, and a combination thereof; at least one material from a second group consisting of Al, Ti, Cr, Co, Ni, and a combination thereof; a first magnetic layer disposed over the spacer layer; and a second magnetic layer disposed over the first magnetic layer.

In another embodiment, a read head sensor includes a seed layer; a capping layer; a spacer layer disposed between the seed layer and the capping layer, the spacer layer comprising at least one material selected from a first group and a second group: the first group consisting of Ta, Ru, Hf, W, and a combination thereof; and the second group consisting of Al, Ti, Cr, Co, Ni, and a combination thereof; and a first magnetic layer and a second magnetic layer, the first and second magnetic layers being disposed between the capping layer and the spacer layer, wherein an etch rate of the spacer layer is equal to an etch rate of the first and second magnetic layer.

In another embodiment, a magnetic recording device includes a first means for reading data disposed at a media facing surface (MFS), the first means for reading data comprising a seed layer; a spacer layer disposed over the seed layer; a first magnetic layer disposed over the spacer layer; a barrier layer disposed over the first magnetic layer; a second magnetic layer disposed over the barrier layer; and a capping layer disposed over the second magnetic layer, the spacer layer comprising at least one material selected from a first or second group: the first group consisting of Ta, Ru, Hf, W, and a combination thereof; and the second group consisting of Al, Ti, Cr, Co, Ni, and a combination thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to magnetic recording heads of magnetic recording devices. To protect and lubricate magnetic elements of the magnetic recording heads (e.g., reader sensors), a coating of carbon is applied to the magnetic element. When there are defects in the carbon coating, the sensor is exposed to air and may corrode causing reader sensor failure. Protrusions and/or recesses may form on the MFS of the sensor when materials that are too hard (e.g., CoHf or Ru) or too soft (e.g., IrMn) are used in the spacer or capping layer of the sensor. By laminating, co-sputtering, or using an alloy with hard material (e.g., Ta, Ru, and/or Hf) and/or soft material (e.g., Al, Ti, Cr, and/or Ni) in the spacer and capping layer of the sensor, the formation of protrusion and recesses in the reader sensor may be mitigated.

Figure 1:
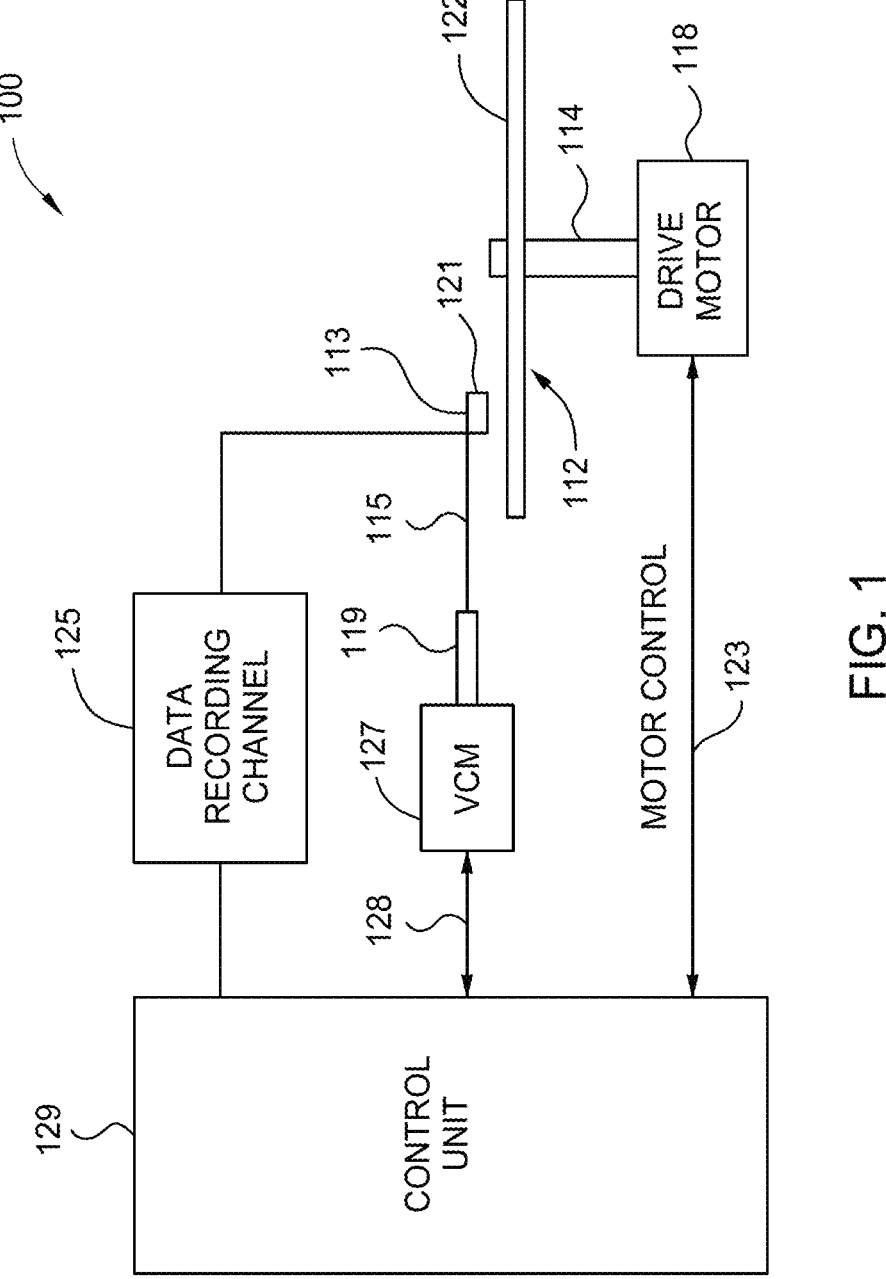
FIG. 1 is a schematic illustration of certain embodiments of a magnetic drive including a read/write head.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
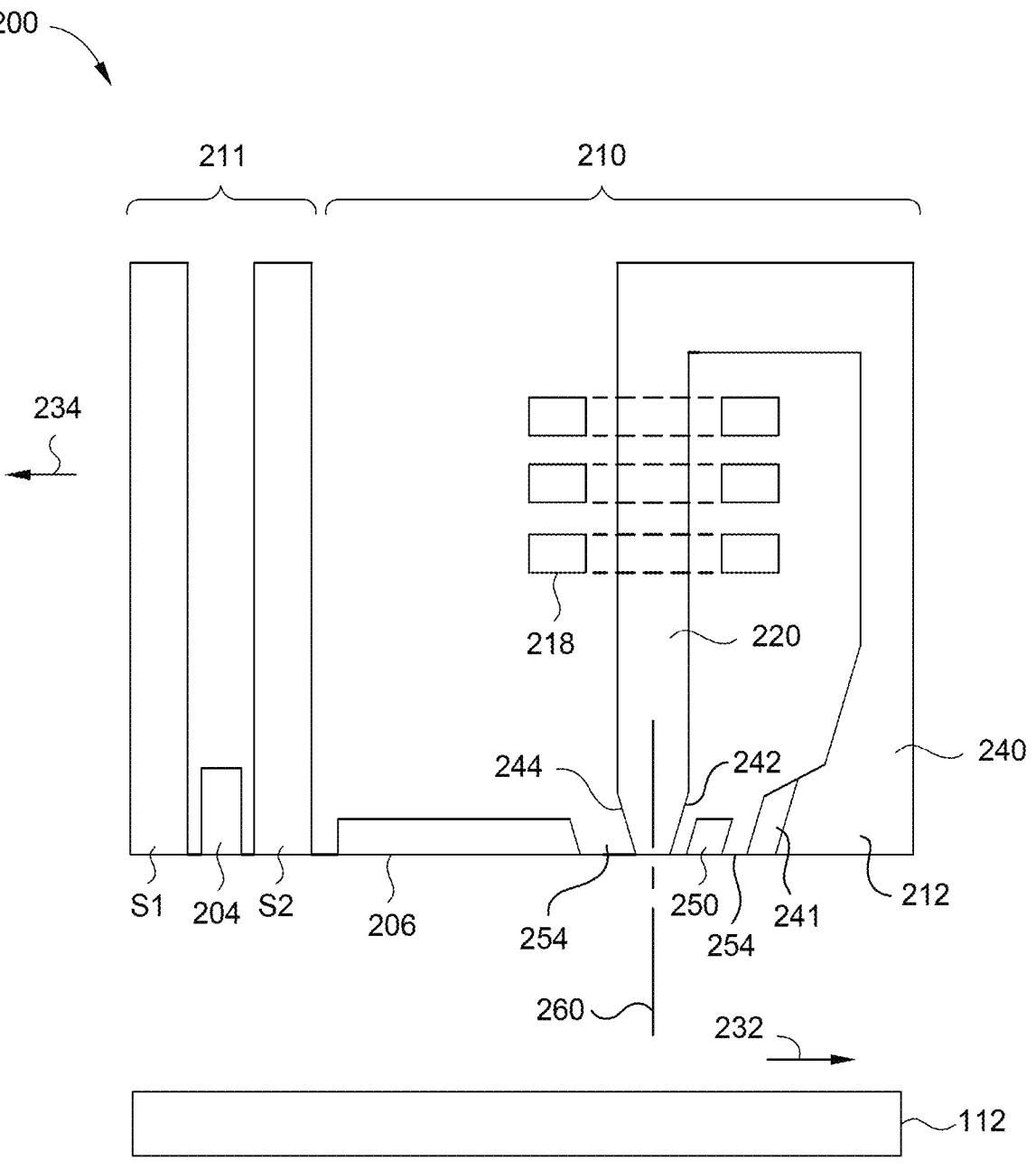
FIG. 2 is a fragmented, cross-sectional side view of certain embodiments of a read/write head.

FIG. 2 is a fragmented, cross-sectional side view of certain embodiments of a read/write head 200. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234. In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, an optional spin torque oscillator (STO), spintronic or conductive device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) effect or enhanced Perpendicular Magnetic Recording (ePMR), the optional STO, spintronic or conductive device 250 is formed in a gap 254 between the main pole 220 and the trailing shield 240. In certain embodiments, the read/write head 200 additionally includes mechanisms (not shown) for supporting Heat Assisted Magnetic Recording (HAMR), which may include a waveguide coupled to a light source and a near field transducer (NFT) placed adjacent to the main pole 220 and coupled to the waveguide to convert the delivered light into a heating spot on the media. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy.

Figure 3:
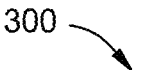
FIG. 3 is a schematic MFS view of a magnetic element, according to one or more embodiments.
Figure 3:
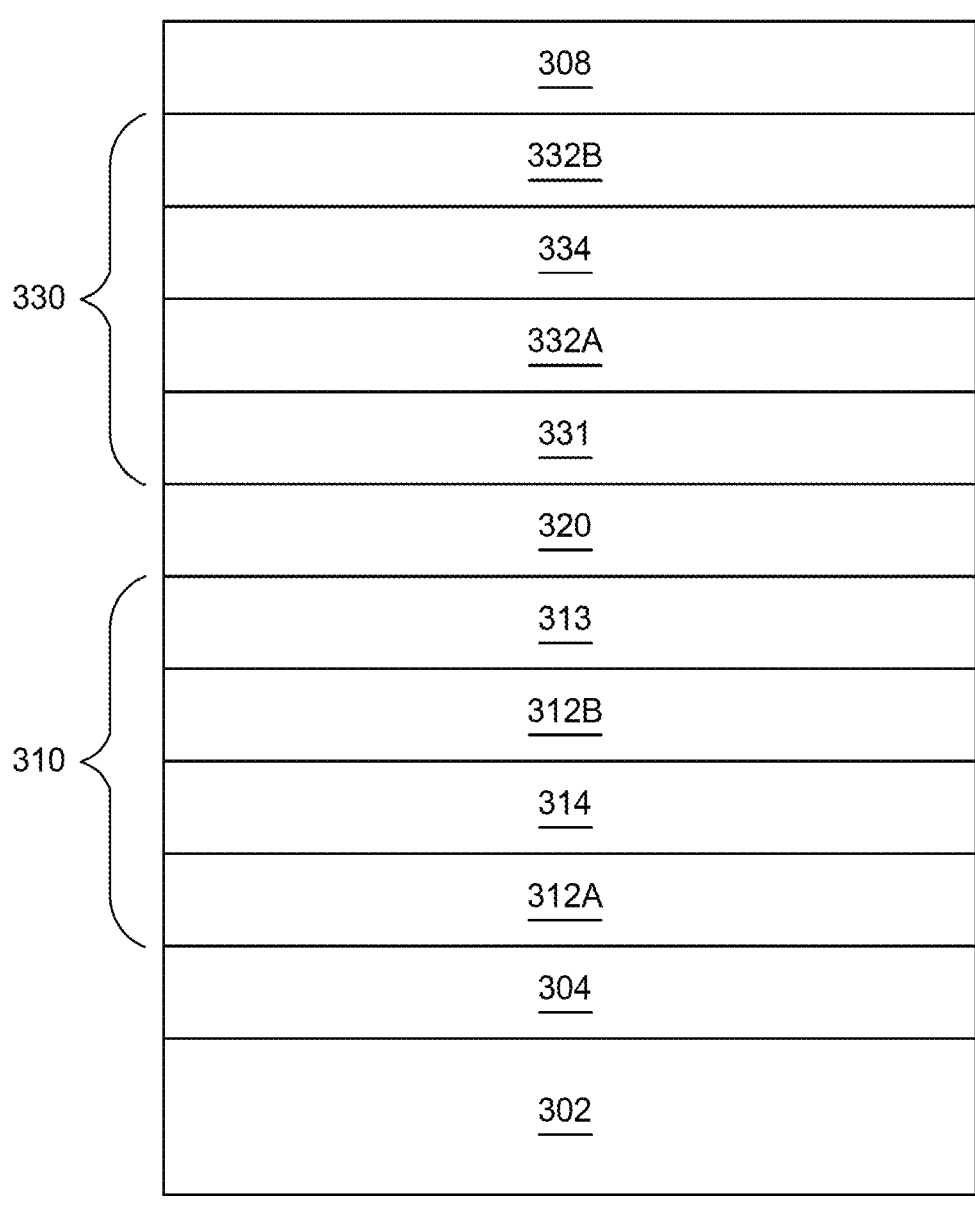

FIG. 3 is a schematic MFS view of a magnetic element 300 (e.g. a reader sensor), according to one or more embodiments. Magnetic element 300 may be the magnetic element between shields S1 and S2 of the magnetic read head 211 of FIG. 2 or other magnetic read heads, from an MFS view. Magnetic element 300 may be utilized in the magnetic recording device 100 of FIG. 1. The magnetic element 300 is a dual free layer (DFL) sensor comprising a first free layer 310 and a second free layer 330 separated by a barrier layer 320, such as an insulating tunneling non-magnetic barrier layer. The magnetic element 300 may be part of a two dimensional magnetic recording (TDMR) read head, like shown in FIG. 6 below, where the DFL TDMR read head would comprise two magnetic elements 300.

The magnetic element 300 may be fabricated by forming a seed layer 302 over a lower shield S1 (not shown). A spacer layer 304 is formed over the seed layer 302. The first free layer 310 is formed over and proximate the spacer layer 304. The barrier layer 320 is formed over the first free layer 310. The second free layer 330 is formed over the barrier layer 320. A capping layer 308 is formed over the second free layer 330. An upper shield S2 (not shown) may be formed over the capping layer 308 by etching back a part of the capping layer and then by contacting to the etch-backed capping layer.

The first free layer 310 comprises a first set of two or more ferromagnetic layers 312 (e.g., ferromagnetic layers 312A, 312B, collectively referred to as ferromagnetic layers 312) and a first amorphous insertion layer 314 between the pluralities of ferromagnetic layers 312. The second free layer 330 comprises a second set of two or more ferromagnetic layers 332 (e.g., ferromagnetic layers 332A, 332B, collectively referred to as ferromagnetic layers 332) and a second amorphous insertion layer 334 between the pluralities of ferromagnetic layers 332.

In some embodiments, the first amorphous insertion layer 314 of the first free layer 310 and the second amorphous insertion layer 334 of the second free layer 330 are ferromagnetic and may independently comprise an alloy of one or more transition metals and one or more amorphous forming elements. The transition metal is Co, Fe, Ni, other suitable transition metals, or combinations thereof. The amorphous forming element is Ta, Zr, Hf, W, Ti, C, P, B, Si, Nb, other suitable amorphous forming element, or combinations thereof. The first amorphous insertion layer 314 and the second amorphous insertion layer 334 independently comprises the one or more amorphous forming elements in an atomic percent in content from greater than about 0 at. % to less than about 30 at. %. In some embodiments, the amorphous insertion layer comprises CoHf.

In some embodiments, each of the first and second amorphous insertion layers 314, 334 independently has a thickness from about 0.05 nm to about 1.0 nm. In such embodiments, each of the first and second amorphous insertion layers 314, 334 independently has a magnetic moment from about 200 emu/cm$^3$ to about 1000 emu/cm$^3$.

In some embodiments, each of the first amorphous insertion layer 314 and the second amorphous insertion layer 334 is non-ferromagnetic and independently comprises CoHf, having an atomic percent of Hf from more than about 10 at. % to about 95 at. % in content. In such embodiments, each of the first and second amorphous insertion layers 314, 334 independently has a thickness from about 0.5 nm or less. In order to control the magnetic moment (Mst) of each of the respective free layers 310, 330, in such embodiments with the non-magnetic material based amorphous insertion layers 314, 334, they are formed thinner in comparison to ferromagnetic materials surrounding the amorphous insertion layers 314, 334. In some embodiments, each of the respective free layers 310, 330 may comprise of different materials. For example, insertion layer 314 of free layer 310 may comprise of a non-magnetic material; whereas, insertion layer 334 of free layer 330 may comprise of a magnetic material—or vice versa. In some embodiments, the amorphous insertion layers may be optional.

Each of the ferromagnetic layers 312, 332 of the DFL independently comprises a material selected from CoB, FeB, CoFeB, CoFe, Co, Fe, NiFe, or other suitable magnetic materials. Each of the plurality of ferromagnetic layers 312, 332 can have the same or different thicknesses. For example, in some embodiments, each of the plurality of ferromagnetic layers 312, 332 independently has a thickness from about 1.0 nm to about 5.0 nm. In some embodiments, each of the first free layer 310 and the second free layer 330 comprises a bilayer, in which each sublayer comprises a material selected from CoB, FeB, and CoFeB and combinations thereof, in which the amorphous insertion layer is between the bilayer. For example, FIG. 3 shows the first free layer 310 comprising ferromagnetic layers 312A, 312B with a first amorphous insertion layer 314 therebetween and shows the second free layer 330 comprising ferromagnetic layers 332A, 332B with a second amorphous insertion layer 334 therebetween. In some embodiments, each of the ferromagnetic layers 312A, 312B may comprise of different materials selected from CoB, FeB, CoFeB, CoFe, Co, Fe, NiFe, or other suitable magnetic materials. In some embodiments, each of the ferromagnetic layers 332A, 332B may comprise of different materials selected from CoB, FeB, CoFeB, CoFe, Co, Fe, NiFe, or other suitable magnetic materials.

US 12,688,867 B2

7

In some embodiments, each of the first free layer 310 and the second free layer 330 further comprises an optional ferromagnetic interface layer 313, 331 between the respective ferromagnetic layers 312B, 332A and the barrier layer 320. Each of the ferromagnetic interface layers 313, 331 independently comprises CoFe, Co, Fe, or a combination thereof. In some embodiments, each of the ferromagnetic interface layers 313, 331 independently comprises CoFe with an atomic percent of Fe from about 5 at. % to about 95 at. % in content. In some embodiments, each of the ferromagnetic interface layers 313, 331 independently has a thickness from 0.1 nm to about 1.0 nm. The ferromagnetic interface layers 313, 331 are interfacing with the barrier layer 320 and promote the crystalline texture of the barrier layer 320, such as a barrier layer comprising MgO with (001) crystalline texture.

In certain aspects, the amorphous insertion layers 314, 334 have a smooth interface for interfacing with the respective ferromagnetic layers 312, 332 providing increased adhesion, reduced delamination thereof and a higher TMR (tunnel magnetoresistive) signal. In some embodiments, each of the ferromagnetic layers 312, 332 and the optional ferromagnetic interface layers 313, 331 independently comprises Co or a Co alloy to further enhance device performance of the DFL.

The ferromagnetic seed layer 302, the spacer layer 304, and the capping layer 308 can comprise any suitable material. For example, the ferromagnetic seed layer 302 may comprise a ferromagnetic material to functionally act as part of the lower shield S1. Examples of magnetic materials of the seed layer 302 include NiFe, CoFe, CoFeB, other magnetic materials, and combinations thereof.

For example, the spacer layer 304 and the capping layer 308 may each individually comprise a non-ferromagnetic, conductive material such as a metal or metallic alloy that separates the free layers from the ferromagnetic seed layer 302 which contacts the lower shield S1. Examples of conductive materials include single or multiple layers of a material selected from a list of metal or metallic alloy elements, such as Ta, Ti, Cr, Ru, Hf, Al, Cu, Ag, Au, W, Co, B, and combinations thereof, such as NiAl, RuAl, (CoB) Hf, and/or CoHf. As referred to herein, a metallic alloy is a mixture of elements into a solid, metallic matrix that contains at least one metal element.

In some embodiments, the spacer layer 304 and capping layer 308 may comprise sub-layers (like shown in FIGS. 4-5) and is laminated, co-sputtered, or alloyed with one or more hard materials (e.g., Ta, Ru, Hf, and/or W) and one or more soft materials (e.g., Al, Ti, Cr, Co, and/or Ni). In some embodiments, the alloy may be NiAl, RuAl, (CoB) Hf, or CoHf. In some embodiments, the spacer layer 304 and capping layer 308 may be co-sputtered—that is, at least one sub-layer of the spacer layer 304 and capping layer 308 contains a hard material (e.g., Ta, Ru, Hf, and/or W) and at least one sub-layer of the spacer layer 304 contains a soft material (e.g., Al, Ti, Cr, Co, and/or Ni). Also, the thickness of the spacer layer 304 may be greater than a minimum value to prevent magnetic coupling between the free layers 310, 330—e.g., between about 20 Å to about 60 Å, such as between about 20 Å to about 45 Å. In some embodiments, the capping layer 308 should be greater than a minimum value to prevent magnetic coupling between the free layers 310, 330—e.g., between about 20 Å to about 60 Å, such as between about 20 Å to about 45 Å, such as 20 Å. In some embodiments, a sub-layer of the spacer layer 304 and capping layer 308 containing the soft material is thicker than a sub-layer of the spacer layer 304 and capping layer 308 containing the hard material.

By laminating, co-sputtering, or using an alloy with hard material(s) (e.g., Ta, Ru, Hf, and/or W) and soft material(s) (e.g., Al, Ti, Cr, Co, and/or Ni) in a spacer layer (e.g., spacer layer 304) and/or a capping layer (e.g., capping layer 308) of the reader sensor, the formation of protrusions and recesses in the reader sensor may be mitigated because the laminated, co-sputtered, or alloyed material(s) can adjust the mill rate of the spacer layer and/or capping layer to match the free layers (e.g., first and second free layers 310, 330) and remove protrusions and recesses on the reader sensor.

The barrier layer 320 can comprise an electrically insulating material of MgO, AlO$_x$, TiO$_x$, or other suitable electrically insulating materials, where x is a numeral greater than 1. In some embodiments, the barrier layer 320 is formed to a thickness of about 1.0 nm or less. In some embodiments, the barrier layer comprises MgO due to the promotion of (001) texture from the optional interface layers 313, 331.

Figure 4:
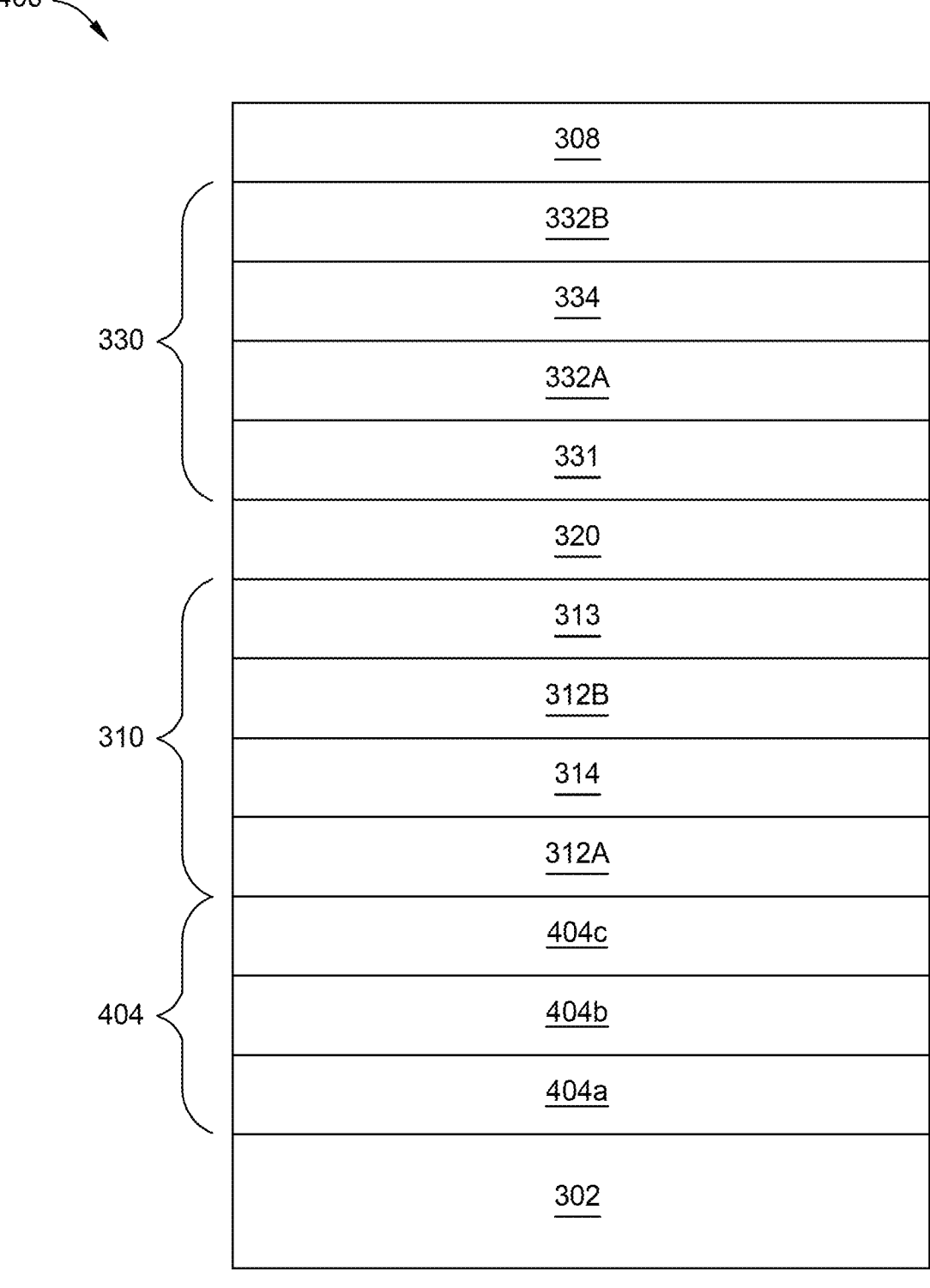
FIG. 4 is a schematic MFS view of a magnetic element, according to one or more embodiments.

FIG. 4 is a schematic MFS view of a magnetic element 400 (e.g. a reader sensor), according to one or more embodiments. Magnetic element 400 may be the magnetic element between shields S1 and S2 of the magnetic read head 211 of FIG. 2 or other magnetic read heads, from an MFS view. Magnetic element 400 may be utilized in the magnetic recording device 100 of FIG. 1. The magnetic element 400 may be part of a TDMR read head, like shown in FIG. 6 below, where the DFL TDMR read head would comprise two magnetic elements 400. Aspects of the magnetic element 400 may be used in combination with aspects of the magnetic element 300 of FIG. 3. The magnetic element 400 comprises the first free layer 310 and the second free layer 330 of magnetic element 300 of FIG. 3. The magnetic element 400 further comprises a spacer layer 404.

Spacer layer 404 may be the spacer layer 304 of FIG. 3. The spacer layer 404 comprises sub-layers 404a, 404b, 404c and is formed over the seed layer 302, while the first free layer 310 is formed over the spacer layer 404. Specifically, the sub-layer 404a is formed over the seed layer 302, the sub-layer 404b is formed over the sub-layer 404a, the sub-layer 404c is formed over the sub-layer 404b, and the first free layer 310 is formed over sub-layer 404c. The spacer layer 404 and sub-layers 404a, 404b, 404c may be any suitable material. Sub-layer 404a comprises a metallic alloy having one or more hard materials and soft materials (e.g., RuAl). Sub-layer 404a has a thickness between about 20 Å and 30 Å, such as 30 Å. Sub-layer 404b comprises a metal that is a hard material (e.g., Ru). Sub-layer 404b has a thickness between about 10 Å and 20 Å, such as 10 Å. Sub-layer 404c comprises CoHf having an atomic percent of Hf from more than about 30 at. % to about 95 at. % in content. Sub-layer 404c has a thickness between about 15 Å and 25 Å, such as 20 Å.

Figure 5:
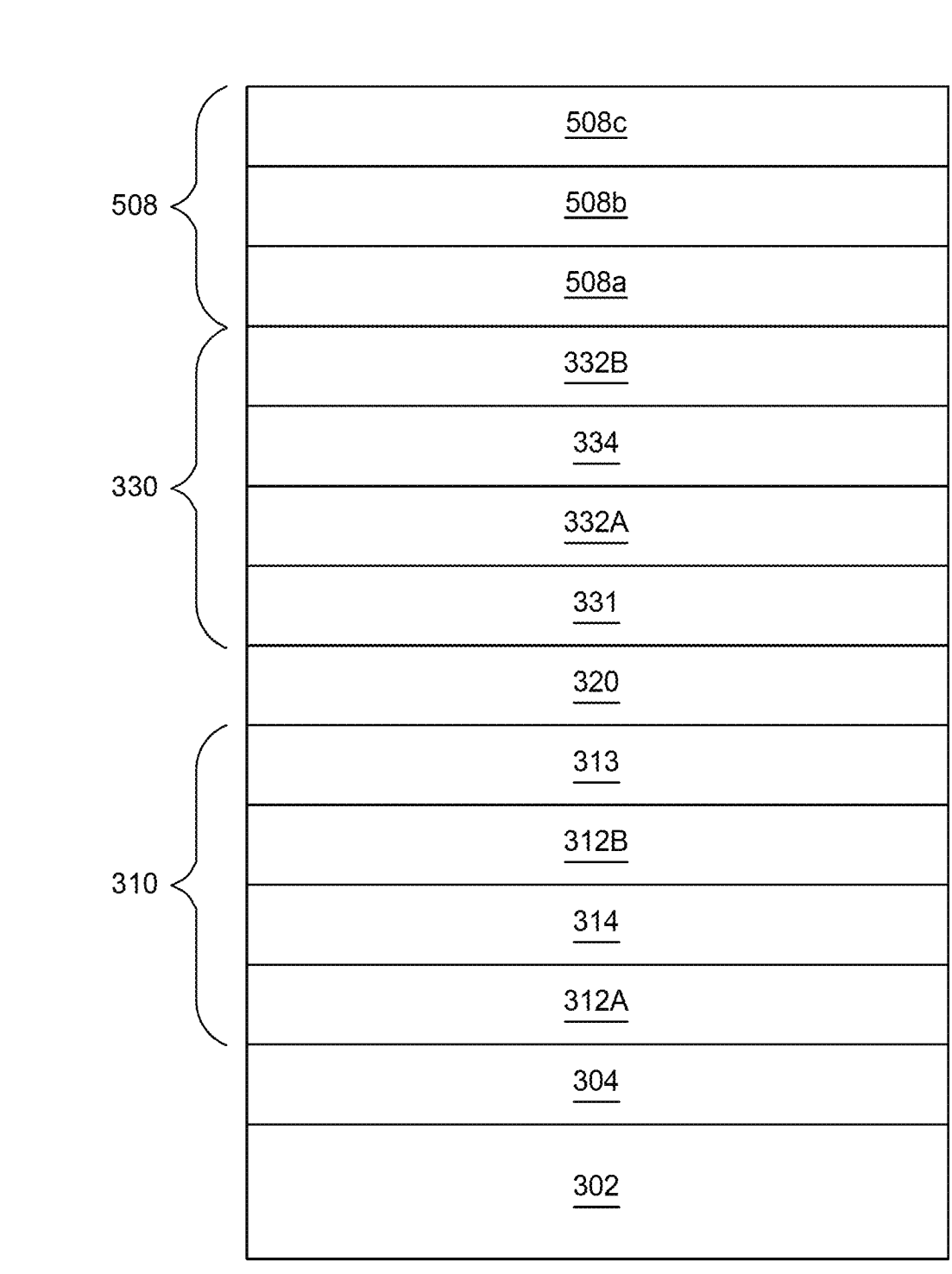
FIG. 5 is a schematic MFS view of a magnetic element, according to one or more embodiments.

FIG. 5 is a schematic MFS view of a magnetic element 500 (e.g., a reader sensor), according to one or more embodiments. Magnetic element 500 may be the magnetic element between shields S1 and S2 of the magnetic read head 211 of FIG. 2 or other magnetic read heads, from an MFS view. Magnetic element 500 may be utilized in the magnetic recording device 100 of FIG. 1. The magnetic element 500 may be part of a TDMR read head, like shown in FIG. 6 below, where the DFL TDMR read head would comprise two magnetic elements 500. Aspects of the magnetic element 500 may be used in combination with aspects of the magnetic element 300 of FIG. 3 and/or the magnetic element 400 of FIG. 4. The magnetic element 500 comprises embodiments of the DFL of the first free layer 310 and the second free layer 330 of magnetic element 300 of FIG. 3. The magnetic element 500 further comprises capping layer 508.

Capping layer 508 may be the capping layer 308 of FIG. 3. The capping layer 508 comprises sub-layers 508a, 508b, 508c, and is formed over the second free layer 330. Specifically, the sub-layer 508a is formed over the ferromagnetic layer 332B, the sub-layer 508b is formed over the sub-layer 508a, and the sub-layer 508c is formed over the sub-layer 508b.

The capping layer 508 and sub-layers 508a, 508b, 508c may be any suitable material. Sub-layer 508a comprises a metallic alloy having one or more hard materials and soft materials (e.g., RuAl or NiAl). Sub-layer 508a has a thickness between about 20 Å and 30 Å, such as 30 Å. Sub-layer 508b comprises a metal that is a hard material (e.g., Ru). Sub-layer 508b has a thickness between about 10 Å and 20 Å, such as 10 Å. Sub-layer 508c comprises CoHf having an atomic percent of Hf from more than about 10 at. % to about 95 at. % in content. Sub-layer 508c has a thickness between about 15 Å and 25 Å, such as 20 Å.

Figure 6:
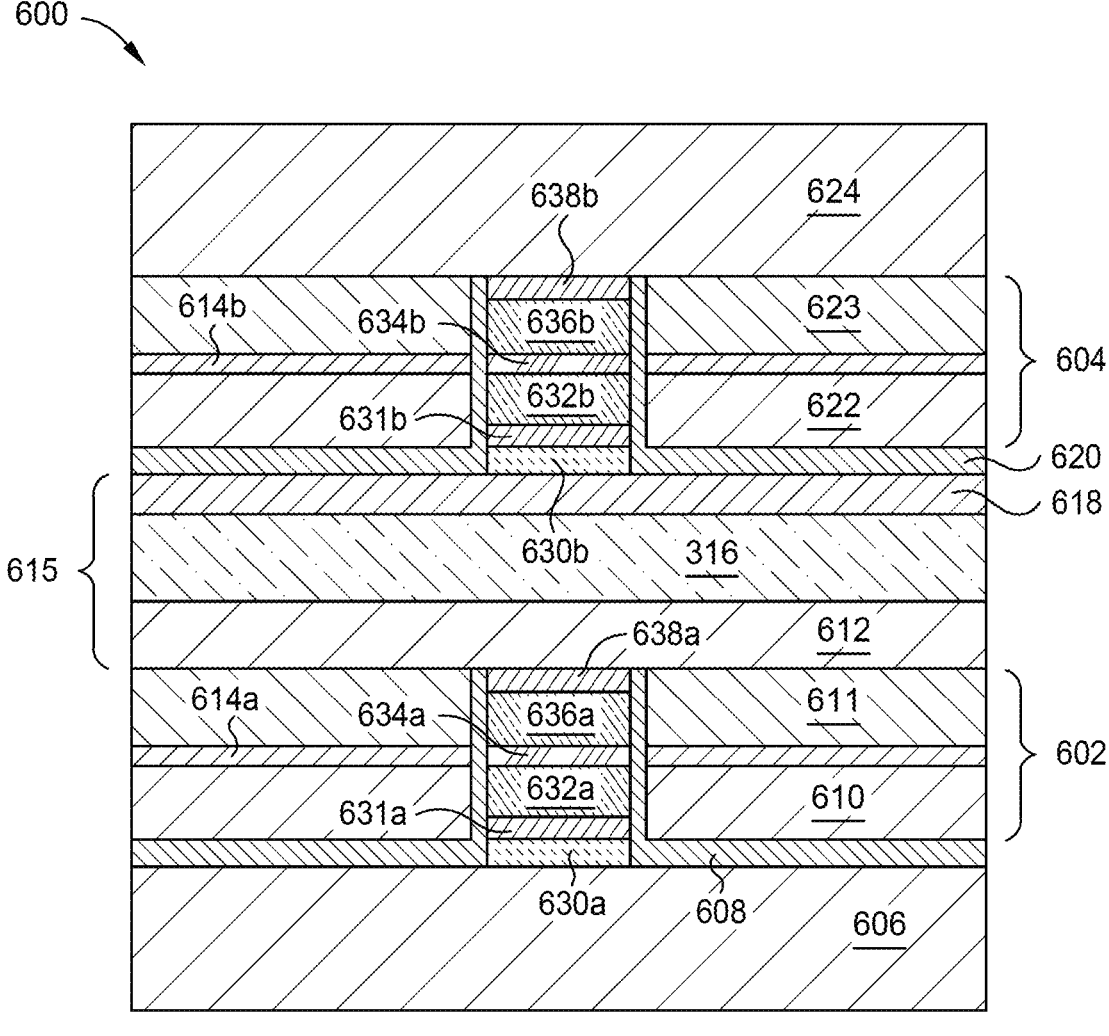
FIG. 6 illustrates a MFS of a dual free layer (DFL) two dimensional magnetic recording (TDMR) read head comprising two sensors or readers, according to one or more embodiments.

FIG. 6 illustrates an MFS of a dual free layer (DFL) two dimensional magnetic recording (TDMR) read head 600 comprising two sensors or readers 602, 604, according to one embodiment. The read head 600 may correspond to, or be a part of, the magnetic head assembly 121 described in FIG. 1. The read head 600 may correspond to, or be a part of, the read/write head 200 described in FIG. 2, such as the magnetic read head 211.

Sensors or readers 602, 604 may independently correspond to magnetic element 300 of FIG. 3, magnetic element 400 of FIG. 4, and/or magnetic element 500 of FIG. 5. Specifically, seed layers 630a, 630b may correspond to seed layer 302, spacer layer 631a, 631b may correspond to spacer layer 304, 404, or 504, first free layers 632a, 632b may correspond to first free layer 310, barrier layers 634a, 634b may correspond to barrier layer 320, second free layer 636a, 636b may correspond to second free layer 330, and capping layer 638a, 638b may correspond to capping layer 308.

The DFL TDMR read head 600 comprises a first lower shield 606, a first insulation layer 608 disposed on the first shield 606, a first sensor or reader 602 disposed on the first lower shield 606 between portions of the first insulation layer 608, a first upper shield 612 disposed over the first sensor 602, a read separation gap (RSG) 616 disposed on the first upper shield 612, a second lower shield 618 disposed on the RSG 616, a second insulation layer 620 disposed on the second lower shield 618, a second sensor or reader 604 disposed on the second lower shield 618 between portions of the second insulation layer 620, and a second upper shield 624 disposed over the second sensor 604. The RSG 616 may comprise AlOx, where x is an integer greater than or equal to 1. The first and second sensors 602, 604 may each individually be tunnel magnetoresistance (TMR) sensors or magnetic tunnel junction (MTJ) sensors. The first and second sensors 602, 604 may be interchangeably referred to as a first reader 602 and a second reader 604 throughout. The first upper shield 612, the RSG 616, and the second lower shield 618 may collectively be referred to herein as middle shields 615, as discussed further below.

The first reader 602 comprises a seed layer 630a, a spacer layer 631a disposed on the speed layer 630a, a first free layer 632a disposed on the spacer layer 631a, a barrier layer 634a disposed on the first free layer 632a, a second free layer 636a disposed on the barrier layer 634a, and a capping layer 638a disposed on the second free layer 636a. The second reader 604 comprises a seed layer 630b, a spacer layer 631b disposed on the seed layer 630b, a first free layer 632b disposed on the spacer layer 631b, a barrier layer 634b disposed on the first free layer 632b, a second free layer 636b disposed on the barrier layer 634b, and a capping layer 638b disposed on the second free layer 636b. While not shown, a rear bias may be disposed behind the first reader 602, recessed from the MFS.

First soft bias layers 610 are disposed on the first insulation layer 608 for the first reader 602 and an anti-ferromagnetically coupled (AFC) layer 614a is disposed between the first soft bias layers 610 and second soft bias layers 611. The first and second soft bias layers 610, 611 are disposed on either side of the first sensor 602 in the x-direction. Similarly, first soft bias layers 622 are disposed on the first insulation layer 620 for the second reader and an AFC layer 614b is disposed between the first soft bias layers 622 and second soft bias layers 623. The first and second soft bias layers 622, 623 are disposed on either side of the second sensor 604 in the x-direction. While not shown, a rear bias may be disposed behind the second reader 604, recessed from the MFS.

The first upper shield 612 and the second upper shield 624 connect seamlessly to the second soft bias layers 611, 623, respectively. The first insulation layer 608 extends in the y-direction on each side of the first sensor 602 to prevent the first sensor 602 from contacting the first soft bias layer 610, the AFC layer 614a, and the second soft bias layer 611. Similarly, the first insulation layer 620 extends in the y-direction on each side of the second sensor 604 to prevent the second sensor 604 from contacting the second soft bias layer 622, and the AFC layer 614b, and the second soft bias layer 623. The AFC layers 614a and 614b comprise a CoFe/Ru/CoFe tri-layer.

EXAMPLES

The following non-limiting examples are provided to further illustrate implementations described herein. However, the examples are not intended to be all-inclusive and are not intended to limit the scope of the implementations described herein.

Figure 7:
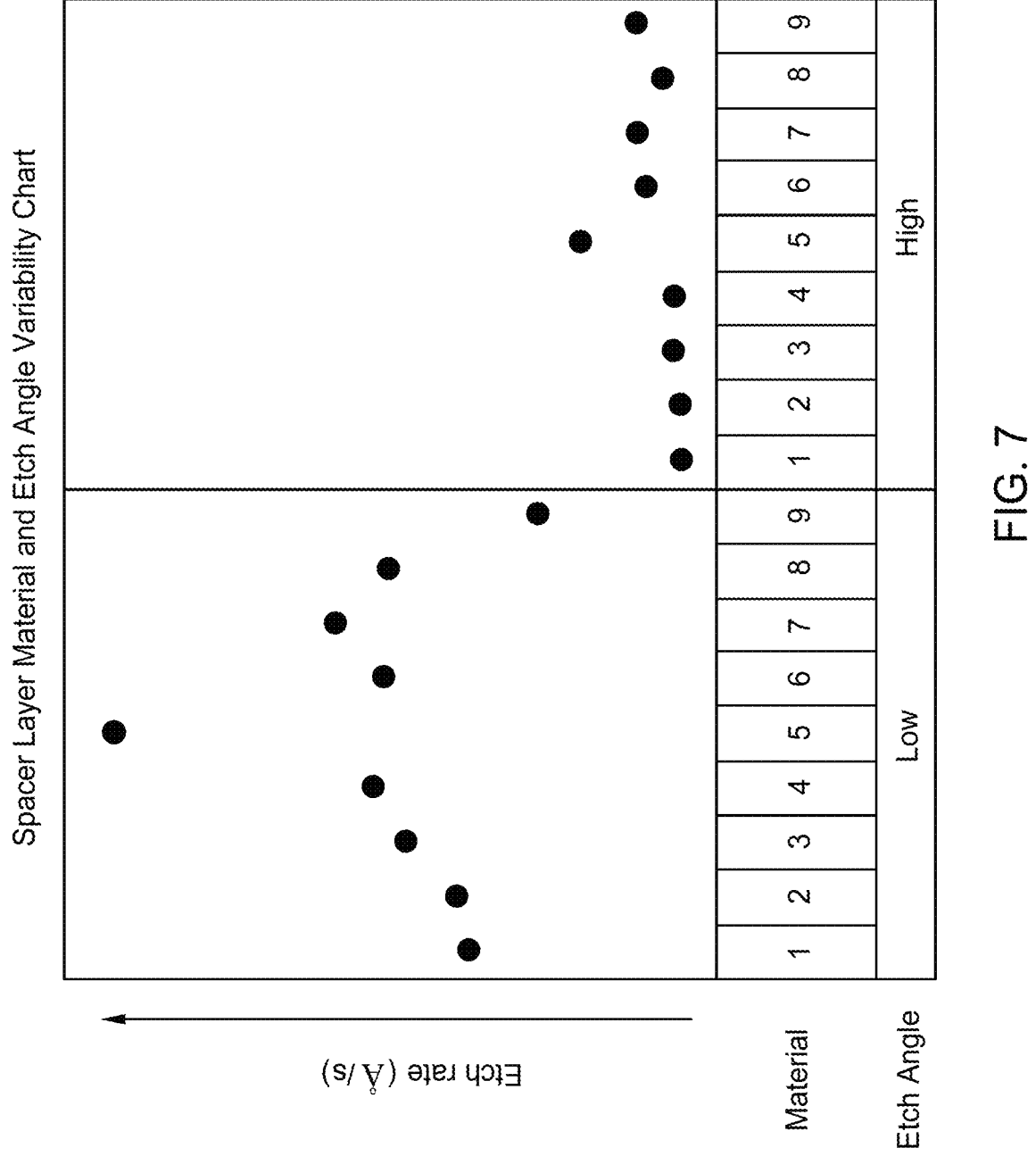
FIG. 7 is a chart of the etch rate (Å/s) of samples of various magnetic elements with various spacers layers and capping layers at different etch angles, according to one or more embodiments.

FIG. 7 is a chart of the etch rate (Å/s) of samples of various spacer layers and/or capping layers at different etch angles, according to one or more embodiments. During the etching process of magnetic recording heads (e.g., reader sensors), in order to control the junction profile different etch angles may be used, or combinations of many angles together. For example, a spacer layer that is difficult to etch will result in a junction that is wider at the bottom than at the top. However, a high etch rate may generate a mushroom-shaped junction (e.g., the top of the junction is wider than the bottom, and is too steep). Thus, by adjusting the spacer layer material and the etching angle, the junction profile may be tuned without the need for sidewall re-deposition. In some embodiments, a material etched at a low etch angle may yield an etch rate that is greater or faster than the same material etched at a high etch angle. In some embodiments, a low etch angle is between about 10 to about 30 degrees, such as 20 degrees. In some embodiments, a high etch angle is between about 70 to about 90 degrees, such as 80 degrees.

Figures 8A, 8B, 8C, 9:
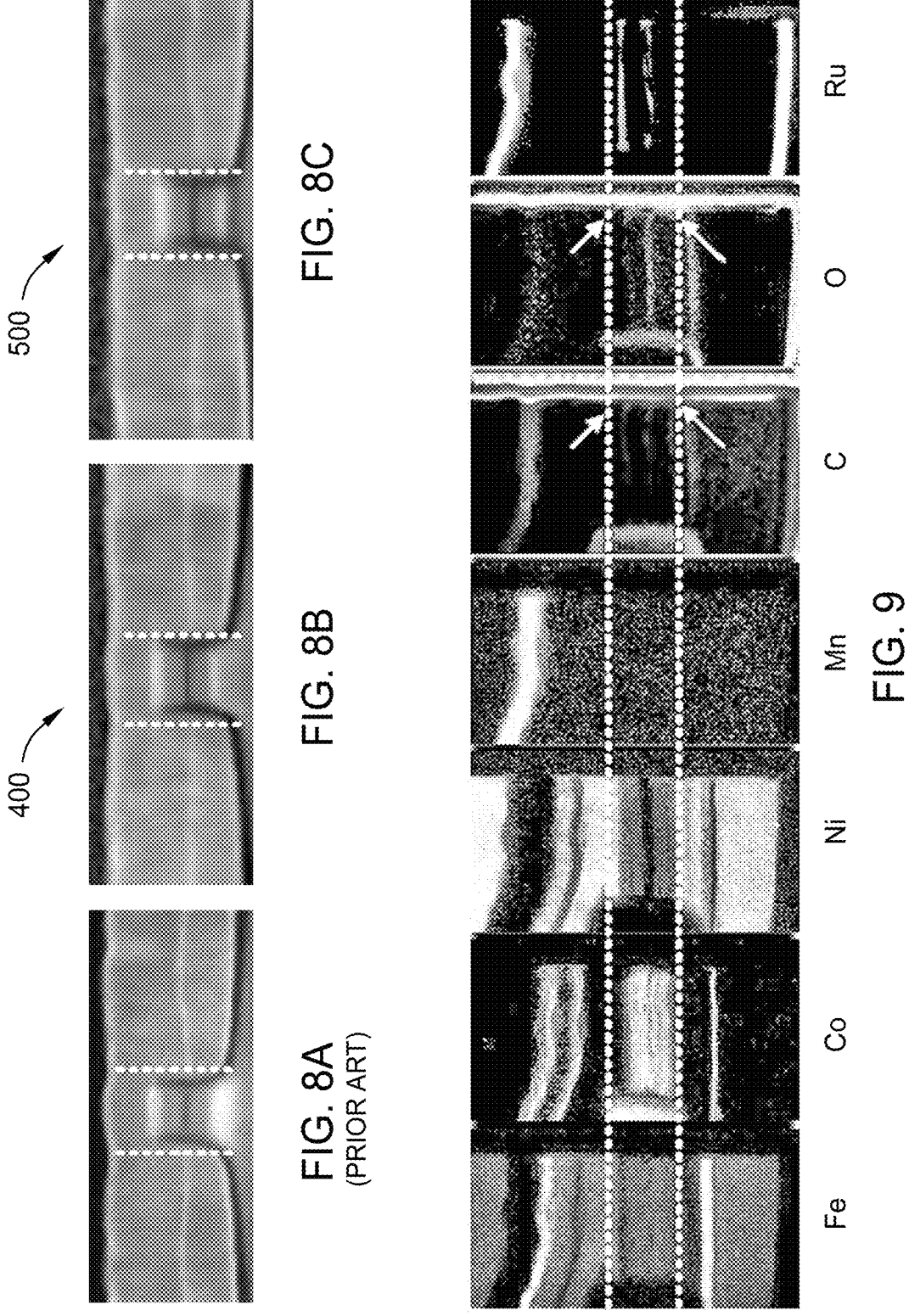
FIGS. 8A-8C depict photos of the improved profile of magnetic elements, according to one or more embodiments.
FIG. 9 depicts photos of the improved profile of magnetic elements, according to one or more embodiments.

FIGS. 8A-8C depict photos of the improved profile of a magnetic element, according to one or more embodiments. Magnetic element 400 of FIG. 8B and magnetic element 500 of FIG. 8C are described in FIGS. 4 and 5, respectively. Magnetic elements 400, 500 have spacer layers and capping layers that may be laminated, co-sputtered, or alloyed with hard material(s) (e.g., Ta, Ru, Hf, and/or W) and soft material(s) (e.g., Al, Ti, Cr, Co, and/or Ni). As shown in the conventional magnetic element of FIG. 8A (prior art) which has a spacer layer and capping layer containing CoHf and/or Ru, the profile (e.g., where the magnetic sensor meets the side shields) of the conventional magnetic element of FIG. 8A is less straight than magnetic element 400 of FIG. 8B or magnetic element 500 of FIG. 8C. By tuning the materials in the spacer layer and capping layer, the etch rate of the spacer layer and capping layer may be adjusted to match to the etch rate of the free layers to remove protrusions and recesses on the magnetic element. Accordingly, a magnetic element with a straighter profile may be achieved.

FIG. 9 depicts photos using electron energy loss spectroscopy (EELS) of the improved profile of various magnetic elements with various spacer layers and capping layers, according to one or more embodiments. As shown in the various EELS photos of FIG. 9 of various magnetic elements with various spacer layers (i.e., Fe, Co, Ni, Mn, C, O, Ru), the magnetic elements having spacer layers comprising carbon and oxygen (i.e., spacer layers and capping layers that are not laminated, co-sputtered, or alloyed with a hard material and a soft material) show the head overcoat thinning or breaking. Such thinning or breakage of the head overcoat may lead to failure of the reader sensors.

Figure 10A:
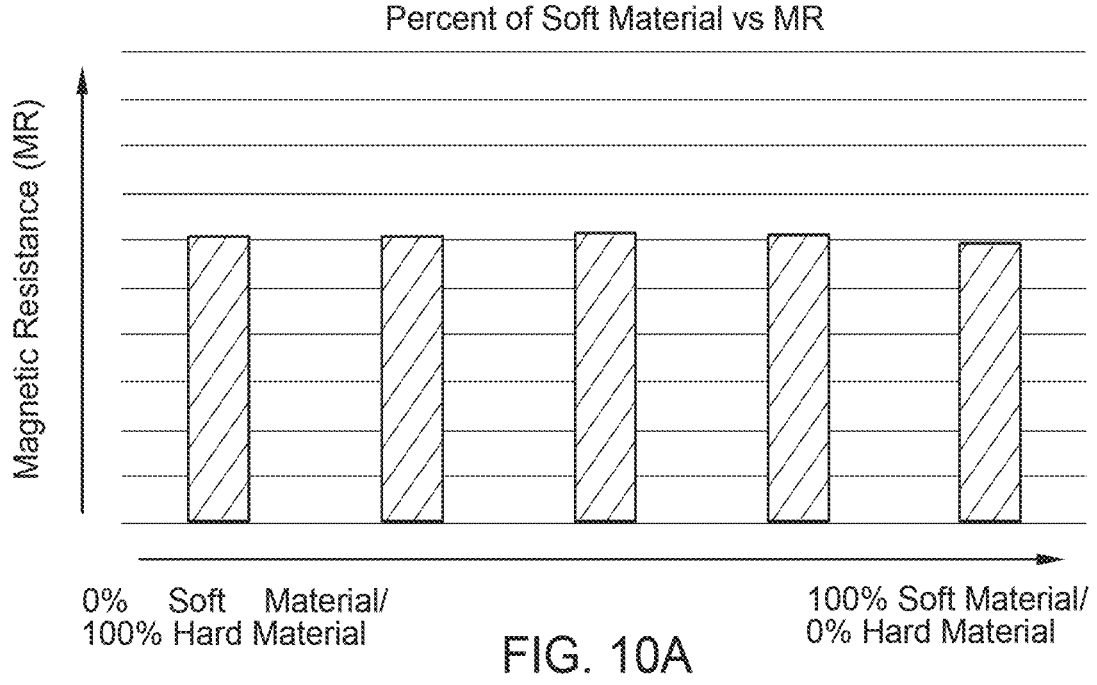
FIG. 10A is a chart of the magnetic resistance (MR) of various magnetic elements with spacer layers having various percentages of soft material, according to one or more embodiments.

FIG. 10A is a chart of the magnetic resistance (MR) of various magnetic elements (e.g., reader sensor) having spacer layers with various percentages of soft material (e.g., Al, Ti, Cr, Co, and/or Ni), according to one or more embodiments. As shown in FIG. 10A, as the percentage of soft material (e.g., Al, Ti, Cr, Co, and/or Ni) in a spacer layer increases, the MR of the reader sensor with the soft material containing spacer layer is unaffected, when compared to a reader sensor with a spacer layer containing conventional hard materials (e.g., CoHf and Ru) of similar thickness. The use of only conventional hard materials (e.g., CoHf and Ru) in the spacer layer may affect the bottom free layer and barrier growth, and thus affect the MR of the reader sensor. Accordingly, various embodiments incorporate soft materials in lieu of the approach of using of only conventional hard materials (e.g., CoHf and Ru) without suffering loss in MR or reader sensor performance, and mitigate the formation of protrusions and recesses and failure in the reader sensor seen in the conventional hard material only approach.

Figure 10B:
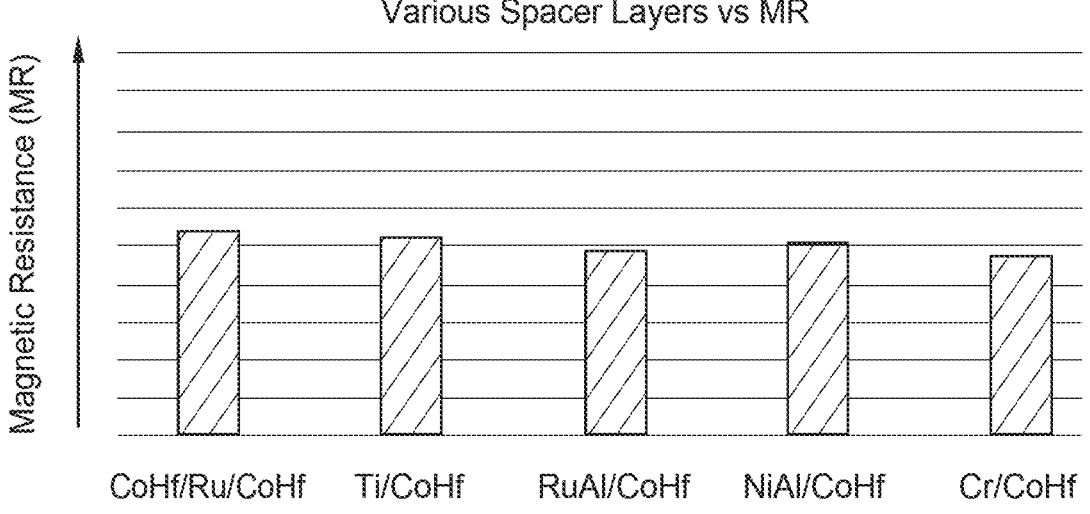
FIG. 10B is a chart of the MR of various magnetic elements having various spacer layers, according to one or more embodiments.

FIG. 10B is a chart of the magnetic resistance (MR) of various magnetic elements (e.g., reader sensor) having various spacer layers, according to one or more embodiments. As shown in FIG. 10B, various samples of magnetic elements having various spacer layers are depicted. The sample "CoHf/Ru/CoHf" has a greater amount of CoHf than each of the other samples in FIG. 10B. However, the MR of the reader sensor with spacer layers containing lesser amounts of CoHf but which are further laminated, co-sputtered, or alloyed with one or more hard material (e.g., Ta, Ru, Hf, and/or W) and soft material (e.g., Al, Ti, Cr, Co, and/or Ni) are unaffected when compared to "CoHf/Ru/CoHf" which uses conventional hard materials (e.g., CoHf and Ru) and has a similar thickness.

Spacer layers or capping layers of magnetic elements (e.g., reader sensors) that use only conventional hard materials (e.g., CoHf and Ru) or only conventional soft materials (e.g., IrMn) are prone to forming protrusions or recesses during the backend lapping process. The protrusions and recesses lead to defective and non-uniform application of a coating of carbon to the magnetic element, which is used to protect and lubricate the magnetic element. When there are defects in the carbon coating, the magnetic element is exposed to air and may corrode causing reader sensor failure. By laminating, co-sputtering, or using an alloy with hard materials (e.g., Ta, Ru, Hf, and/or W) and soft materials (e.g., Al, Ti, Cr, Co, and/or Ni) in the spacer and/or capping layer of the sensor, formation of protrusion and recesses in the reader sensor may be mitigated.

In one embodiment, a read head sensor includes a seed layer; a spacer layer disposed over the seed layer, the spacer layer comprising at least one material selected from a first group consisting of Ta, Ru, Hf, W, and a combination thereof; at least one material from a second group consisting of Al, Ti, Cr, Co, Ni, and a combination thereof; a first magnetic layer disposed over the spacer layer; and a second magnetic layer disposed over the first magnetic layer.

The read head sensor further comprises a capping layer disposed over the second magnetic layer, and wherein the capping layer comprises at least one material selected from the first group and at least one material selected from the second group. A thickness of the spacer layer is less than 60 Å. The spacer layer further comprises a first sub-layer and a second sub-layer, the first sub-layer comprises a material selected from the first group and the second sub-layer comprises the at least one material selected from the first group and at least one material selected from the second group. The second sub-layer comprises RuAl or NiAl, and wherein the first sub-layer comprises Ta, Ru, Hf, W, or a combination thereof. A thickness of the second sub-layer is greater than a thickness of the first sub-layer. The spacer layer further comprises a third sub-layer comprising CoHf. An etch rate of the spacer layer is equal to an etch rate of the first and second magnetic layer. A magnetic recording device comprising the read head sensor.

In another embodiment, a read head sensor includes a seed layer; a capping layer; a spacer layer disposed between the seed layer and the capping layer, the spacer layer comprising at least one material selected from a first group and a second group: the first group consisting of Ta, Ru, Hf, W, and a combination thereof; and the second group consisting of Al, Ti, Cr, Co, Ni, and a combination thereof; and a first magnetic layer and a second magnetic layer, the first and second magnetic layers being disposed between the capping layer and the spacer layer, wherein an etch rate of the spacer layer is equal to an etch rate of the first and second magnetic layer.

The spacer layer further comprises a plurality of sub-layers, a first sub-layer of the plurality of sub-layers comprising a material selected from the first group and a second sub-layer of the plurality of sub-layers comprising the at least one material selected from the first group and the second group. The second sub-layer is disposed over the first sub-layer, and wherein a thickness of the second sub-layer is greater than a thickness of the first sub-layer. A thickness of the first sub-layer is between 5 Å and 15 Å. A total thickness of the first and second sub-layers is less than 40 Å. The spacer layer and the capping layer comprise the same material. A magnetic recording device comprising the read head sensor.

In another embodiment, a magnetic recording device includes a first means for reading data disposed at a media facing surface (MFS), the first means for reading data comprising a seed layer; a spacer layer disposed over the seed layer; a first magnetic layer disposed over the spacer layer; a barrier layer disposed over the first magnetic layer; a second magnetic layer disposed over the barrier layer; and a capping layer disposed over the second magnetic layer, the spacer layer comprising at least one material selected from a first or second group: the first group consisting of Ta, Ru, Hf, W, and a combination thereof; and the second group consisting of Al, Ti, Cr, Co, Ni, and a combination thereof.

The spacer layer comprises at least one material selected from the first group and the second group. An etch rate of the capping layer is equal to an etch rate of the first and second magnetic layer. The capping layer further comprises a plurality of sub-layers, a first sub-layer of the plurality of sub-layers comprising a material selected from the first group and a second sub-layer of the plurality of sub-layers comprising the at least one material selected from the first group and the second group. A second means for reading data disposed adjacent to the first means for reading data.

While the foregoing is directed to embodiments of the present disclosure, other and further embodiments of the disclosure may be devised without departing from the basic scope thereof, and the scope thereof is determined by the claims that follow.

What is claimed is:

1. A read head sensor, comprising:
a seed layer;
a spacer layer disposed over the seed layer, the spacer layer comprising:
  a first sub-layer, the first sub-layer consisting of at least one material selected from a first group consisting of Ta, Ru, Hf, W, and a combination thereof;
  a second sub-layer disposed in contact with the seed layer and the first sub-layer, the second sub-layer comprising at least one material selected from the first group and at least one material selected from a second group consisting of Al, Ti, Cr, Co, Ni, and a combination thereof; and
  a third sub-layer disposed in contact with the first sub-layer, the third sub-layer comprising CoHf, wherein a composition of the second sub-layer is separate and distinct from a composition of the third sub-layer;
a first free layer disposed in contact with the third sub-layer; and
a second free layer disposed over the first free layer.

2. The read head sensor of claim 1, wherein the read head sensor further comprises a capping layer disposed over the second free layer, and wherein the capping layer comprises at least one material selected from the first group and at least one material selected from the second group.

3. The read head sensor of claim 1, wherein a thickness of the spacer layer is less than 60 Å.

4. The read head sensor of claim 1, wherein the second sub-layer comprises RuAl.

5. The read head sensor of claim 1, wherein a thickness of the second sub-layer is greater than a thickness of the first sub-layer.

6. The read head sensor of claim 1, wherein an etch rate of the spacer layer is equal to an etch rate of the first and second free layer.

7. A magnetic recording device comprising the read head sensor of claim 1.

8. The read head sensor of claim 1, wherein a thickness of the second sub-layer is between 20 Å and 30 Å.

9. The read head sensor of claim 8, wherein a thickness of the first sub-layer is between 10 Å and 20 Å.

10. A read head sensor, comprising:
a seed layer;
a capping layer, the capping layer comprising:
  a first sub-layer, the first sub-layer comprising at least one material selected from a group consisting of Ta, Ru, Hf, W, Al, Ti, Cr, Co, Ni, and a combination thereof;

a second sub-layer disposed in contact with the first sub-layer, the second sub-layer consisting of at least one material selected from Ta, Ru, Hf, W, and a combination thereof, wherein a composition of the second sub-layer is separate and distinct from a composition of the first sub-layer; and
  a third sub-layer disposed in contact with the second sub-layer, the third sub-layer comprising CoHf;
a first free layer disposed between the seed layer and the capping layer; and
a second free layer disposed between the first free layer and the first sub-layer, wherein an etch rate of the capping layer is equal to an etch rate of the first and second free layer, and wherein the second free layer is disposed in contact with the capping layer.

11. The read head sensor of claim 10, wherein a thickness of the second sub-layer is less than a thickness of the first sub-layer.

12. The read head sensor of claim 11, wherein a total thickness of the first and second sub-layers is less than 40 Å.

13. The read head sensor of claim 10, wherein a thickness of the first sub-layer is between 20 Å and 30 Å.

14. The read head sensor of claim 13, wherein a thickness of the second sub-layer is between 10 Å and 20 Å.

15. The read head sensor of claim 10, wherein:
the read head sensor further comprises a spacer layer disposed between the seed layer and the first free layer;
the capping layer comprises a third sub-layer disposed over the second sub-layer; and
the spacer layer and the third sub-layer of the capping layer comprise a same material.

16. A magnetic recording device comprising the read head sensor of claim 10.

17. A magnetic recording device, comprising:
a first means for reading data disposed at a media facing surface (MFS), the first means for reading data comprising:
  a seed layer;
  a spacer layer disposed over the seed layer;
  a first free layer disposed over the spacer layer;
  a barrier layer disposed over the first free layer;
  a second free layer disposed over the barrier layer; and
  a capping layer disposed in contact with the second free layer, the spacer layer comprising:
    a first sub-layer, the first sub-layer consisting of at least one material selected from a first group consisting of Ta, Ru, Hf, W, and a combination thereof;
    a second sub-layer disposed in contact with the seed layer and the first sub-layer, the second sub-layer comprising at least one material selected from the first group and at least one material selected from a second group consisting of Al, Ti, Cr, Co, Ni, and a combination thereof; and
    a third sub-layer disposed in contact with the first sub-layer, the third sub-layer comprising CoHf, wherein a composition of the second sub-layer is separate and distinct from a composition of the third sub-layer.

18. The magnetic recording device of claim 17, wherein an etch rate of the spacer layer is equal to an etch rate of the first and second free layer.

19. The magnetic recording device of claim 17, wherein the capping layer further comprises a plurality of sub-layers, a first sub-layer of the plurality of sub-layers comprising a material selected from the first group and a second sub-layer of the plurality of sub-layers comprising the at least one material selected from the first group and at least one material selected from the second group.

20. The magnetic recording device of claim 17, further comprising a second means for reading data disposed adjacent to the first means for reading data.

* * * * *